United States Patent
Robin et al.

(10) Patent No.: US 8,269,684 B2
(45) Date of Patent: Sep. 18, 2012

(54) NAVIGATION, IDENTIFICATION, AND COLLISION AVOIDANCE ANTENNA SYSTEMS

(75) Inventors: Seymour Robin, Woodland Hills, CA (US); Robert C. Weber, Sunland, CA (US); Rajah Castillo, Valencia, CA (US)

(73) Assignee: Sensor Systems, Inc., Chatsworth, CA (US)

( * ) Notice: Subject to any disclaimer, the term of this patent is extended or adjusted under 35 U.S.C. 154(b) by 345 days.

(21) Appl. No.: 12/796,096

(22) Filed: Jun. 8, 2010

(65) Prior Publication Data

US 2011/0298649 A1    Dec. 8, 2011

(51) Int. Cl.
*H01Q 9/00*    (2006.01)
(52) U.S. Cl. ........ 343/749; 343/752; 343/830; 343/705; 343/708
(58) Field of Classification Search .................. 343/749, 343/752, 830, 705, 708
See application file for complete search history.

(56) References Cited

U.S. PATENT DOCUMENTS

| | | | |
|---|---|---|---|
| 5,191,349 A | 3/1993 | Dinsmore et al. | 343/751 |
| 5,552,788 A | 9/1996 | Ryen et al. | 342/30 |
| 6,278,396 B1 | 8/2001 | Tran | 342/29 |
| 6,313,783 B1 | 11/2001 | Kuntman et al. | 342/32 |
| 6,433,729 B1 | 8/2002 | Staggs | 342/29 |
| 6,683,541 B2 | 1/2004 | Staggs et al. | 340/961 |
| 6,917,341 B2* | 7/2005 | Ishihara et al. | 343/752 |
| 6,985,103 B2 | 1/2006 | Ridderheim et al. | 342/30 |
| 6,999,022 B1 | 2/2006 | Vesel et al. | 342/30 |
| 7,006,032 B2 | 2/2006 | King et al. | 342/29 |
| 7,385,560 B1 | 6/2008 | Maloratsky | 343/705 |
| 7,391,374 B2* | 6/2008 | Inatsugu et al. | 343/700 MS |
| 7,508,343 B1 | 3/2009 | Maloratsky | 342/374 |
| 7,868,818 B2* | 1/2011 | Henderson | 342/175 |

OTHER PUBLICATIONS

Jang, Yong Woong. et al., "A Low-Profile, Top-Loaded Monopole Antenna with Four Small Posts", Microwave Journal, vol. 49, No. 4, Apr. 2006, 3 pages.
Maloratsky, Leo G., "RF Design of Avionics L-band Integrated Systems", Microwave Journal. vol. 52, No. 10, Oct. 2009, 13 pages.
Wiolland, Kim, "TCAS Uncovered", Avionics News, Jul. 2006, 4 pages.

* cited by examiner

*Primary Examiner* — Hoang V Nguyen
(74) *Attorney, Agent, or Firm* — Koppel, Patrick, Heybl & Philpott

(57) ABSTRACT

Antenna embodiments are illustrated that are particularly suited for use in aircraft navigation, identification and collision avoidance systems. An exemplary antenna embodiment operates about a center wavelength and in association with a ground plane and comprises first and second grounded, shortened, and top loaded monopoles. These monopoles are spaced apart above a ground plane and each of them includes a feed post, a shorted post, and a top load wherein the shorted post is spaced from the feed post, is coupled to the ground plane, and has a length less than one fourth of the center wavelength. In addition, the top load is coupled to the feed post and the shorted post and is configured along orthogonal minor and major axes of the top load to have a width along the minor axis and a length along the major axis that exceeds the width.

20 Claims, 4 Drawing Sheets

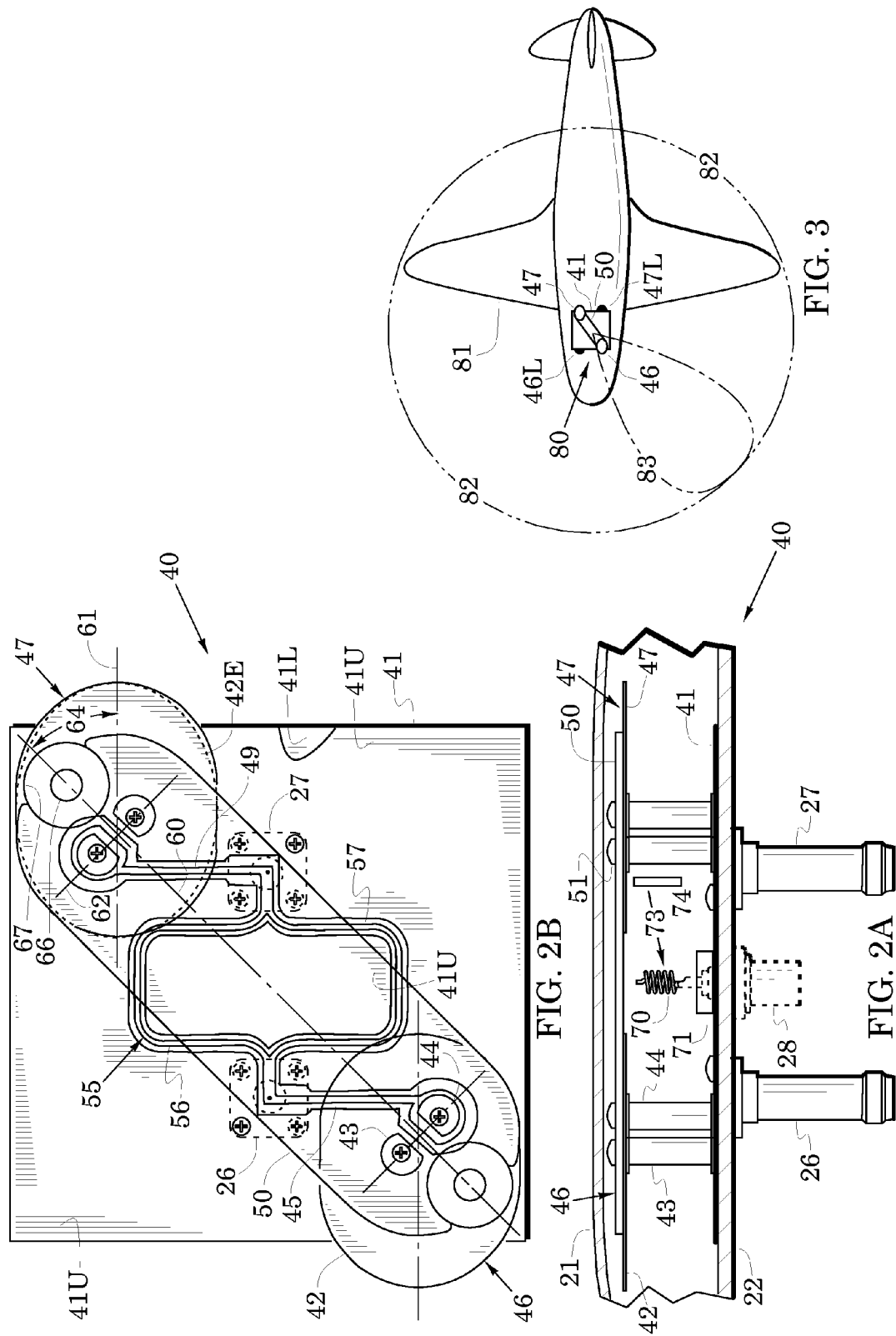

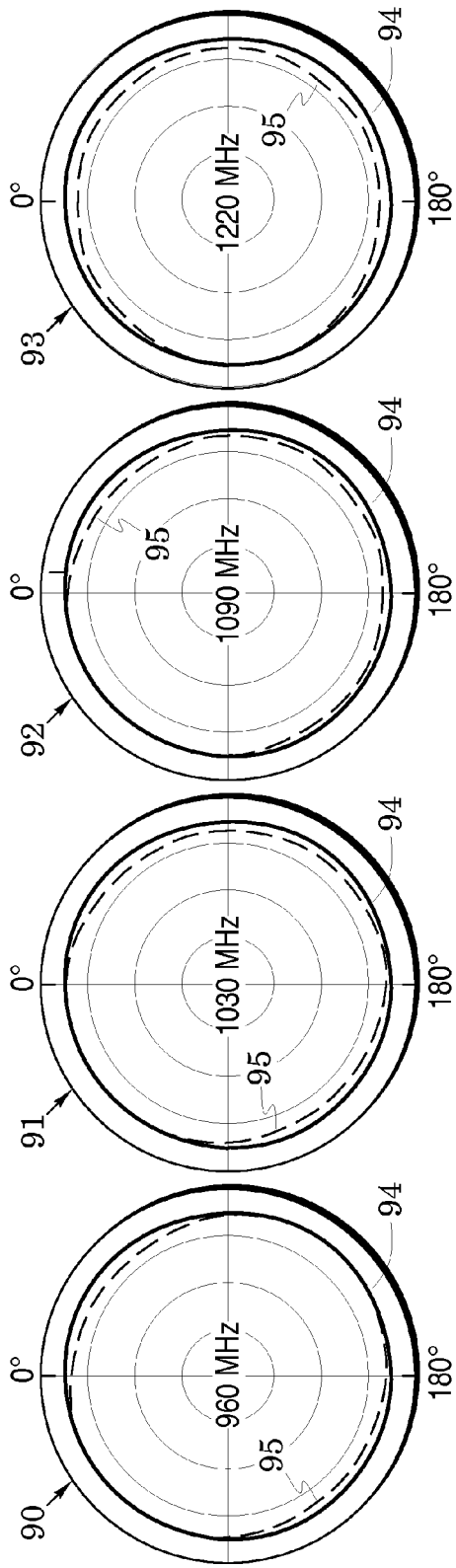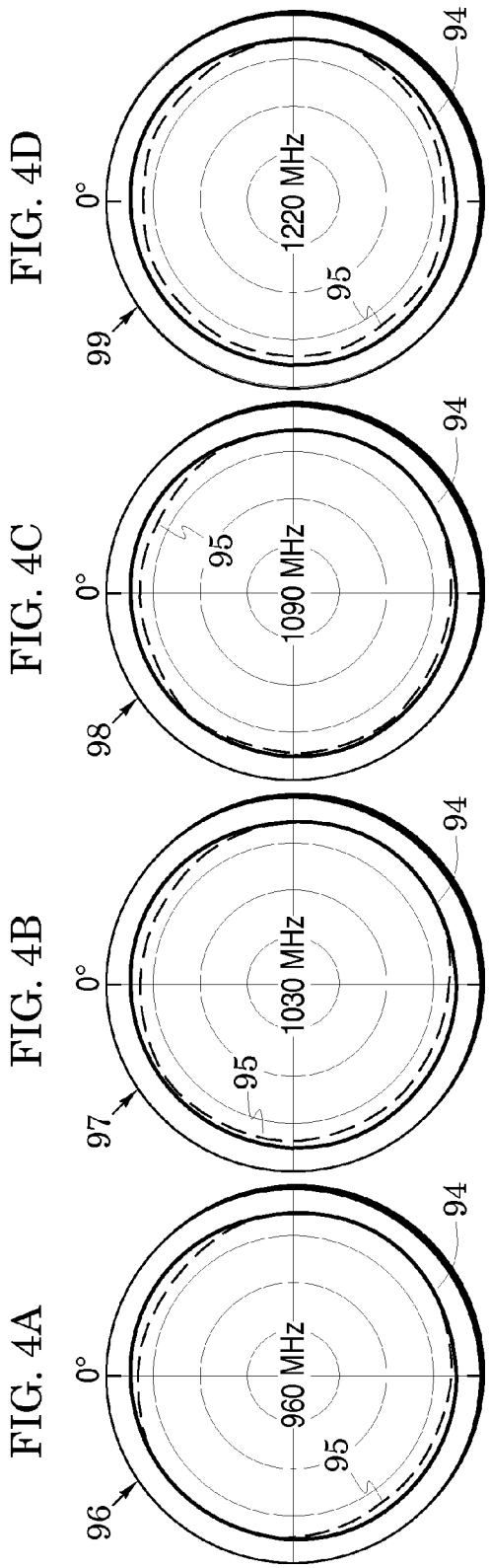

NAVIGATION, IDENTIFICATION, AND COLLISION AVOIDANCE ANTENNA SYSTEMS

BACKGROUND OF THE INVENTION

1. Field of the Invention

The present invention relates generally to aircraft antennas.

2. Description of the Related Art

The Distance Measuring Equipment (DME) system is configured to be especially useful in aircraft navigation. The DME system operates in various channels across the frequency band between 900 and 1200 MHz and computes distance from a ground-based receiver by measuring the time signal pulses take for a transmitted pulse to transit between an aircraft and the receiver and then return to the aircraft. In the DME system, aircraft ground speed can also be found by averaging the change in distance.

In contrast, Transponders are the airborne component of the Air Traffic Control Radar Beacon System and are especially useful in aircraft identification and navigation. In this system, aircraft are interrogated with pulses at a frequency of 1030 MHz. When an aircraft receives the interrogation, its transponder sends a reply at a frequency of 1090 MHz. The interrogator's processor then decodes the reply, identifies the aircraft and determines the range via the delay between interrogation and reply. Aircraft azimuth is determined from antenna pointing directions.

More recently, the Traffic Alert Collision Avoidance System (TCAS) has been developed in response to a history of disastrous mid-air accidents. It is a predictive warning system that is included within a broader airborne collision avoidance system (ACAS) to reduce aircraft collisions. It employs surveillance radar transponders with signal interrogations to survey and determine the presence of airspace conflicts. In particular, the system constantly evaluates a specific volume of airspace and the geometry around it to resolve conflicts within the airspace.

In at least one mode of TCAS, the interrogations cooperate with any aircraft that is equipped with an appropriate transponder. Omni-directional signals (generally known as squitters) are radiated once per second to announce an aircraft's presence to other like-equipped aircraft. Following receipt of a squitter, TCAS sends an interrogation at a selected frequency (e.g., 1030 MHz) to the address contained in a received message. Intruder range is determined by the time delay between interrogation and the reply sequence at a selected frequency (e.g., 1090 MHz) and this process may be effectively managed with a whisper-shout routine.

In the whisper-shout routine, signal transmission begins with a first pair of low-power interrogation pulses—a whisper that nearby aircraft can respond to. After a short delay, a second pair of interrogation pulses is radiated at a higher power. This second pair, however, is preceded by a pulse at the lower power of the first pair. Any transponders that replied to the first pair will not reply to the shout of the second pair. This process can be continued with progressively higher-power pulses to thereby solicit responses while reducing the signal traffic flow.

If this TCAS process indicates an imminent collision, the interrogating aircraft is advised to take action vertically to avoid the developing threat. Vertical flight-path changes have been found to be the quickest resolution to a possible conflict. This action must be accomplished prior to the "closest point of approach" (CPA) which is the point ahead that the aircraft's processor predicts will be an area of conflict with an intruder aircraft. Rather than distance, TCAS processors generally concentrate on determining the time in seconds to the CPA and the horizontal miss distance to the CPA. In the presence of high closure rates (e.g., 1200 knots) and high vertical rates (e.g., 10,000 feet per minute) time is obviously critical. Even so, some TCAS interrogation modes can simultaneously track numerous aircraft (e.g., 30) in a wide coverage range (e.g., 30 nautical miles).

System accuracy and sensitivity are highly reliant on the ability of TCAS antennas to form a steerable beam of enhanced antenna gain. Preferably, an electronically-controlled solid angle is created by differential phase control of the TCAS antennas. With precise phase control, a TCAS processor is then able to place the antenna beam in any of multiple locations about an aircraft. Because phase control is critical to system accuracy, it is important to control any variation in phase due to changes in aircraft antennas and interconnecting cables. Therefore, internal phase calibration is preferably provided to remove errors due to physical changes in the system (e.g., in cables and production electrical disconnects).

Beam steering can be used to transmit interrogations to selected solid-angle segments of the antenna array while transmission to non-selected areas is suppressed. The antenna angle of arrival can be further resolved by directional interrogations in the remaining zones around the aircraft. A TCAS processor can control signal phasing of all elements in the antenna to thereby direct radiation patterns around the aircraft.

From the above descriptions, it is apparent that the combined operations of the DME, Transponder and TCAS systems places demanding performance requirements on antenna structures.

BRIEF SUMMARY OF THE INVENTION

Aircraft antenna systems are provided that are especially useful in aircraft navigation, identification and collision avoidance systems. An antenna embodiment operates about a center wavelength and in association with a ground plane. This embodiment comprises first and second grounded, shortened, and top loaded monopoles. These monopoles are spaced apart above a ground plane and each of them includes a feed post, a shorted post, and a top load wherein the shorted post is spaced from the feed post, is coupled to the ground plane, and has a length less than one fourth of the center wavelength. In addition, the top load is coupled to the feed post and the shorted post and is configured along orthogonal minor and major axes of the top load to have a width along the minor axis and a length along the major axis that exceeds the width. The drawings and the following description provide an enabling disclosure and the appended claims particularly point out and distinctly claim disclosed subject matter and equivalents thereof.

BRIEF DESCRIPTION OF THE DRAWINGS

FIG. 2A is an enlarged view of a portion of FIG. 1A with a side of an antenna radome removed to expose an embodiment of an inner antenna;

FIG. 2B is a plan view of the antenna of FIG. 2A with the antenna radome completely removed;

FIG. 3 is a view of an airplane and an exemplary installation thereon of two of the antennas of FIGS. 2A and 2B;

FIGS. 4A-4D and FIGS. 5A-5D are diagrams of antenna patterns at first and second antenna connectors of the antenna of FIGS. 2A and 2B across a predetermined frequency band;

DETAILED DESCRIPTION OF THE INVENTION

FIGS. 1-7 illustrate multi-band antenna embodiments that are particularly suited for use in aircraft navigation, identification and collision avoidance systems. These antenna embodiments include monopoles which are configured so that each monopole is substantially isolated from others and has its elements arranged to enhance its measured performance (e.g., as shown by radiation patterns and VSWR) across an operational frequency band.

Figure 1C:
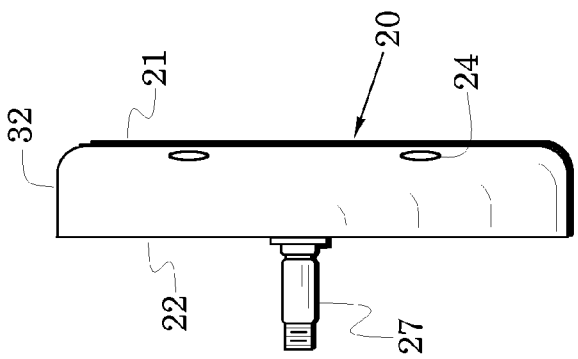
FIGS. 1A, 1B and 1C are side, bottom and end views of an enclosed antenna embodiment.
Figure 1A:
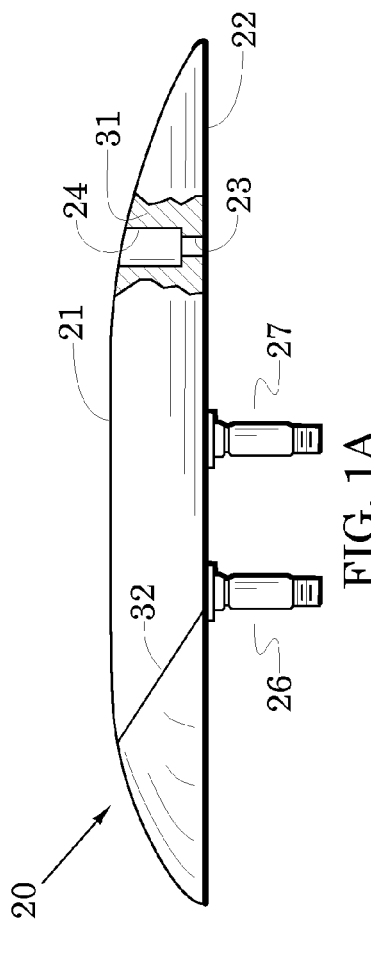

In particular, FIG. 1A illustrates an airborne enclosed antenna 20 that is formed with a radome 21 carried on a baseplate 22. The radome can be formed with various electromagnetically-transparent materials and the baseplate can be formed with various metals (e.g., aluminum).

The radome and baseplate are preferably formed to define mounting holes 23 for attaching the antenna 20 to an aircraft surface. Each of the mounting holes may transition to a greater-diameter portion 24 to thereby receive the head of a mounting bolt and hide it from the outer surface of the radome 21. Although the baseplate is shown to be planar in FIGS. 1A-1C, it may be shaped differently in other antenna embodiments to conform with a matching surface of an aircraft.

Electrical connectors 26 and 27 are carried on the baseplate 22. When the antenna is mounted on the outer skin of an aircraft, the connectors protrude inward through a hole in the aircraft skin that is approximately the size of a broken-line circle 29 in FIG. 1B. The connectors are then within an O-ring that can be carried in an O-ring groove 31 in the baseplate 22. The O-ring abuts the aircraft skin and seals the connectors 26 and 27 from the outer environment. A hermetic seal of the antenna interior may be enhanced with a polymer fill 31 (e.g., a low-density foam) beneath the radome outer surface.

Figure 1B:
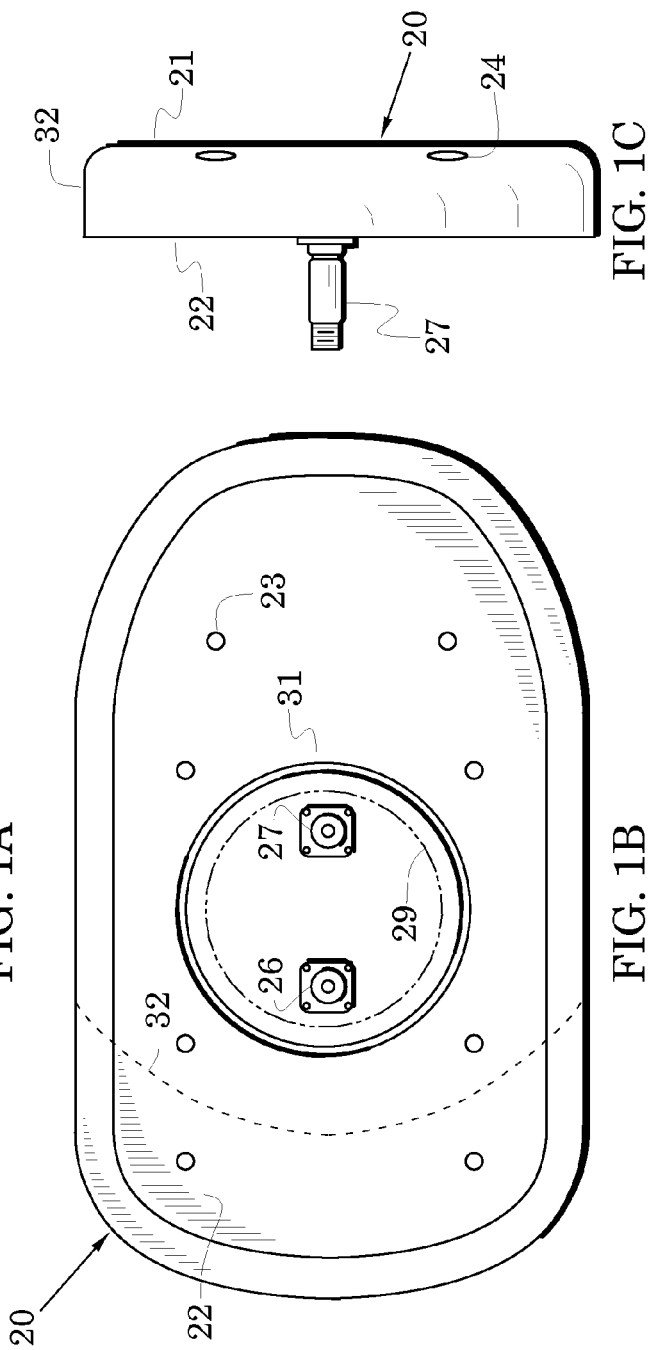

As shown in FIGS. 1A, 1B, and 1C, the radome 21 is preferably formed with an aerodynamic shape (e.g., a "teardrop" shape) to thereby minimize its resistance to an air stream that flows over the aircraft skin. The leading edge of the radome may carry a film 32 (e.g., a polymer) to provide protection from erosion caused by airborne matter (e.g., particulates, raindrops, sand and hail).

FIG. 2A is an enlarged view of FIG. 1A with a side of the radome 21 removed to expose an antenna embodiment 40 within. FIG. 2B is a top view of the antenna 40 of FIG. 2A with the radome removed to expose the antenna. These figures include elements of FIGS. 1A-1C with like elements indicated by like reference numbers. Although these antenna structures can be sized to operate at various frequency bands, they are sized in an exemplary embodiment to operate over a frequency band bounded by the frequencies of 960 MHz and 1220 MHz.

FIGS. 2A and 2B show a conductive ground plane 41 that is carried on the baseplate 22. A top load 42 is spaced from the ground plane by a shorted post 43 and a feed post 44 is spaced away from the shorted post. The shorted post is electrically grounded to the ground plane and the feed post is electrically joined to a transmission line 45 that leads to the center conductor of the connector 26.

The transmission line is preferably formed by a signal path that is spaced over a lower conductive sheet 41L of the ground plane 41. An upper conductive sheet 41U is carried on the top of the ground plane and is laterally spaced from the transmission line 45. This line and the lower conductive sheet 41L form a microstrip transmission line while the upper conductive sheet 41U isolates the line from other antenna structures and provides a ground for other electronic circuits. The lower and upper conductive sheets are preferably spaced apart by a dielectric.

The top load 42, shorted post 43 and feed post 44 form a first shorted, top loaded, electrically-shortened monopole 46 that is arranged in FIG. 2B over the lower left portion of the ground plane 41. Flipped horizontally and vertically in FIG. 2B and positioned diagonally across the ground plane 41 (i.e., positioned in the upper right portion of the ground plane) is a second shorted, top loaded, electrically-shortened monopole 47 that is formed similarly to the first monopole 46. The feed post of the monopole 47 is electrically joined to a microstrip transmission line 49 that leads to the center conductor of the connector 27.

When the antenna 40 of FIGS. 2A and 2B is mounted on an airplane, it is subjected to considerable accelerations in addition to substantial vibrations. To insure the antenna's electrical performance in this hostile environment, it has been found desirable to physically stabilize the first and second monopoles 46 and 47 by coupling a stabilizer bar 50 between them. The bar may be formed from various electromagnetically-transparent materials (e.g., teflon glass) and is preferably secured to the shorted post 43 and feed post 44 of each monopole (with the aid, for example, of screws 51—the shapes of the bar and the screws are selectable and are shown in FIGS. 2A and 2B in exemplary forms). To enhance visibility of various structures of the antenna 40, the stabilizer bar 50 is drawn as though it were formed of a transparent material.

In an antenna embodiment, a tuned compensation network 55 is coupled between the connectors 26 and 27. This network comprises first and second transmission lines 56 and 57 that diverge apart as they pass between the connectors 26 and 27. The first and second lines are configured to have slightly different physical lengths (not observable in FIG. 2B) and thus slightly different electrical lengths. A signal at the connector 26, for example, travels through each of the paths and is recombined at the connector 27 with a signal from the feed post of the monopole 47. This network is thus arranged to facilitate selection of an electrical difference in the path lengths to thereby transport an out-of-phase gain component from one of the connectors 26 and 27 to the other to thereby enhance isolation between the monopoles. This electrical isolation is important as it permits the spacing between the monopoles to be substantially reduced (e.g., to less than ¼ wavelength ($\lambda/4$)).

Additional important structural arrangements and relationships are provided in the antenna 40 of FIGS. 2A and 2B to enhance a variety of additional antenna performance parameters (e.g., return loss, (VSWR), radial symmetry, and bandwidth). These arrangements and relationships may be examined and illustrated by defining a monopole axis 60 in FIG. 2B along which the first and second monopoles 46 and 47 are spaced apart. It is further noted that the top loads, e.g., top load 42, are arranged with a shape that has a width along a minor axis and a length along an orthogonal major axis 61 that exceeds the width. Finally, the shorted post and feed post of each monopole are arranged along a post axis 62.

It has also been found that antenna parameters are enhanced when the major axis 61 is rotated from the monopole axis 60 by a rotation angle 64 between 40 and 50 degrees with 45 degrees being a preferred angle. It has further been found that antenna parameters are enhanced when the post axis 62 is substantially orthogonal to the monopole axis 60 with both feed posts on opposite sides of the monopole axis and both shorted posts on opposite sides of the monopole axis.

It has further been found that antenna parameters are enhanced when the top loads have an oblong shape, i.e., a shape resembling a circle elongated along the major axis 61 as shown in FIG. 2B or a shape resembling an ellipse as indicated by broken lines 42E in FIG. 2B. These shapes have been found to reduce element coupling and to increase return loss. It is also noted that VSWR at the connectors 26 and 27 may be enhanced by appropriate selection of the diameter of the feed posts 44 and that bandwidth is increased by appropriate selection of the diameter of the shorted posts 43 and their spacing from their respective feed post.

As mentioned above, phase matching of an antenna is critical to realize TCAS system accuracy. Accordingly, a TCAS system's processor typically phase-calibrates the antenna to the remainder of the system. To facilitate this calibration, FIG. 2A illustrates a probe 70 that is positioned between the first and second monopoles 46 and 47 (e.g., midway between the monopoles) to provide a signal indicative of the phase of signals associated with the monopoles. This probe signal may be particularly useful for enhancing signal phasing in a TCAS system that includes the antenna 40.

In the illustrated embodiment, the probe 70 is formed as a coil but various other embodiments may be used. For example, the substitution arrow 73 shows that a rod embodiment 74 may be substituted for the coil. Detected signals of the probe 70 may be conditioned through electronics 71 (e.g., a detector and a limiter) to provide a scaled DC signal which exits the antenna through a circuit path to a selected connector. The selected connector may be the connector 26, the connector 27 or a connector 28 (shown in broken lines) that is added in FIG. 2A between the connectors 26 and 27.

FIG. 3 illustrates an antenna system 80 that is formed by installing a first one of the antenna 40 of FIGS. 2A and 2B on the upper skin of the airplane and by inverting a second one of the antenna 40 and installing it on the lower skin of the airplane. The first and second monopoles 46 and 47 of the first antenna are shown in white along with their associated support bar 50. To enhance illustration clarity, the first and second monopoles 46L and 47L of the second antenna are shown in black.

When any of the monopoles of the system 80 is energized, the system generates a substantially-circular antenna pattern 82 that is especially suited for use in the DME and Transponder systems and, when all of the antennas are appropriately energized and phased, the system is especially suited for operating with directional antenna beams, e.g., beam 83) in the TCAS system. An important measure of antenna suitability for use in these systems are antenna patterns which indicate regions of equal signal strength when the antenna is used as a radiator (it is recalled that reception and radiation performances are equivalent in antennas). Measured radiation patterns either of the monopoles 46 and 47 of the antenna 40 of FIGS. 2A and 2B at frequencies 960, 1030, 1090 and 1220 MHz are shown in FIGS. 4A-4D and 5A-5D. Diagrams 90, 91, 92, and 93 of FIGS. 4A-4D correspond to the monopole 46 and diagrams 96, 97, 98, and 99 of FIGS. 5A-5D correspond to the monopole 47.

In each of these diagrams, a solid-line pattern 94 is that of a theoretically-perfect monopole whose dimensions are not limited by practical considerations (e.g., aerodynamic considerations). This pattern forms a standard against which real patterns can be compared. In each of the figures, broken-line radiation patterns 95 indicate measured performance of the antenna 40. Because these radiation patterns closely approximate the ideal monopole performance, it is apparent that the various structural relationships of the antenna 40 (e.g., top load configuration, major axis orientation, post axis orientation and compensation network) are particularly effective.

Figure 6:
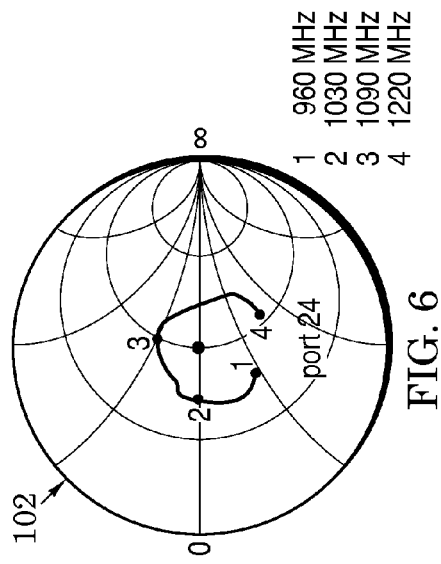
FIG. 6 is a Smith chart that shows the voltage standing wave ratio (VSWR) at connectors 26 and 27 of FIGS. 2A and 2B across a predetermined frequency band.

Another measure of antenna suitability is VSWR which indicates how well an antenna is impedance-matched to the impedance of its associated transmission lines, e.g., the impedance of connectors 26 and 27 in FIG. 2A. Reflected power is minimized and transmitted power maximized in an antenna system that is well matched. The Smith chart 100 of FIG. 6 shows VSWR measurements at the connectors 26 and 27 of FIG. 2A at frequencies 960, 1030, 1090, and 1220 MHz. A bold-line track that connects the plotted VSWR's closely circles the enter of the chart which indicates that the monopole impedances are well matched over frequency to the impedances of the connectors.

In a TCAS operational process, signals in the 900 to 1200 MHz range are radiated and received from all of the monopoles of FIG. 3. The phasing between the signals is selected to generate an electronically-controlled solid angle and to also steer the solid angle about the orientation of the aircraft as exemplified by the beam 83 in FIG. 3. In a DME or Transponder operational process, signals in the 900 to 1200 MHz range are radiated and received from a selected one of the monopoles of FIG. 3. Generally, the selected monopole is either the monopole 46L or the monopole 47L as they have an unobstructed view of the ground.

Figure 7:
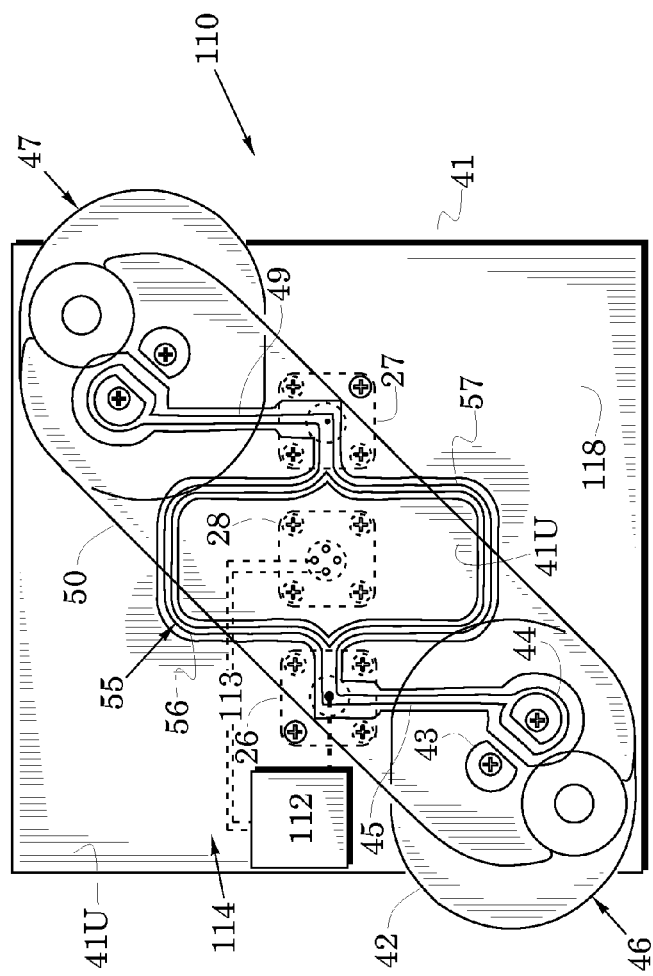
FIG. 7 is view similar to that of FIG. 2B which shows another antenna embodiment.

A probe 70 was shown in FIGS. 2A and 2B. As described above, the probe provided a signal indicative of the phase of signals associated with the monopoles 46 and 47. This signal can be useful, for example, to a TCAS processor for calibrating the antenna to the remainder of the TCAS system. FIG. 7 illustrates other structure which is useful for calibrating an antenna. In particular, FIG. 7 shows an antenna embodiment 110 which includes elements of the antenna 40 of FIGS. 2A and 2B with like elements indicated by like reference numbers. This embodiment provides a synthesizer 112 which can provide phase-stable signals to a selected one of the coaxial connectors 26 and 27 through a circuit path that is indicated by a heavy broken line in FIG. 7. The frequency of the signals of the synthesizer 112 can be commanded via a command line and power may be provided to the synthesizer via a power line. These circuit lines 113 may lead, for example, to a multi-pin embodiment of the connector 28 that was shown in FIG. 2A.

The signals of the synthesizers are preferably crystal-based signals so that their phases are extremely stable. In an exemplary use, commands over at least one of the circuit lines 113 cause the synthesizer to initiate a two-tone phase calibration signal. This signal may comprise a first brief tone at a first selected frequency, e.g., 1030 MHz, followed by a second brief tone at a second selected frequency, e.g., 1090 MHz.

Because the phases of these tones are extremely stable and their amplitude substantially greater than the system's antenna signals, the tones can be received (from connectors 26 and 27) and differentiated by the system's processor to determine any changes in system's signal path lengths associated with the first and second monopoles 42 and 47. The TCAS processor is thus enabled to calibrate the antenna to the remainder of the TCAS system. Accordingly, the processor can constantly update the phase calibration to thereby correct potential TCAS measurement errors due to in-flight changes in structure, e.g., transmission lines.

The embodiments of the invention described herein are exemplary and numerous modifications, variations and rearrangements can be readily envisioned to achieve substantially equivalent results, all of which are intended to be embraced within the spirit and scope of the appended claims.

We claim:

1. An antenna to operate about a center wavelength and in association with a ground plane, comprising first and second grounded, shortened, and top loaded monopoles that are spaced apart above said ground plane wherein each of said first and second monopoles includes:
   a feed post;
   a shorted post spaced from said feed post, coupled to said ground plane, and having a length less than one fourth of said center wavelength; and
   a top load coupled to said feed post and said shorted post and configured along orthogonal minor and major axes of said top load to have a width along said minor axis and a length along said major axis that exceeds said width.

2. The antenna of claim 1, wherein said top load has a substantially elliptical shape.

3. The antenna of claim 2, wherein:
   said first and second monopoles are spaced apart along a monopole axis of said antenna; and
   said major axis is rotated from said monopole axis by a rotation angle.

4. The antenna of claim 3, wherein said rotation angle is between 40 and 50 degrees.

5. The antenna of claim 2, wherein:
   said first and second monopoles are spaced apart along a monopole axis of said antenna; and
   said feed post and said shorted post are positioned on a post axis of said antenna that is substantially orthogonal to said monopole axis.

6. The antenna of claim 5, wherein the feed posts of said first and second monopoles are positioned on opposite sides of said monopole axis and the shorted posts of said first and second monopoles are positioned on opposite sides of said monopole axis.

7. The antenna of claim 5, wherein said major axis is rotated from said monopole axis by a rotation angle between 40 and 50 degrees.

8. The antenna of claim 2, further including:
   a first signal compensation path arranged to communicate with feed posts of said first and second monopoles and having a first length; and
   a second signal compensation path arranged to communicate with feed posts of said first and second monopoles and having a second length that differs from said first length to thereby enhance performance of said antenna.

9. The antenna of claim 2, further including a probe positioned above said ground plane and between said first and second monopoles to thereby provide a calibration signal for said antenna.

10. The antenna of claim 9, wherein said probe is configured as a coil.

11. The antenna of claim 2, further including:
   first and second electrical connectors;
   first and second transmission lines each connecting a feed post of a respective one of said first and second monopoles to a respective one of said first and second connectors; and
   a synthesizer arranged to provide a calibration signal to a respective one of said first and second electrical connectors.

12. The antenna of claim 1, wherein said top load has a substantially oblong shape.

13. An antenna to operate about a center wavelength and in association with a ground plane, comprising:
   first and second monopoles that are spaced apart above said ground plane wherein each of said first and second monopoles includes:
   a feed post;
   a shorted post spaced from said feed post, coupled to said ground plane, and having a length less than one fourth of said center wavelength; and
   a top load coupled to said feed post and said shorted post and configured along orthogonal minor and major axes of said top load to have a width along said minor axis and a length along said major axis that exceeds said width;
   and wherein:
   said first and second monopoles are spaced apart along a monopole axis of said antenna; and
   said major axis is rotated from said monopole axis by a rotation angle between 40 and 50 degrees.

14. The antenna of claim 13, wherein:
   said feed post and said shorted post are positioned on a post axis of said antenna that is substantially orthogonal to said monopole axis; and
   the feed posts of said first and second monopoles are positioned on opposite sides of said monopole axis and the shorted posts of said first and second monopoles are positioned on opposite sides of said monopole axis.

15. The antenna of claim 13, further including:
   a first signal compensation path arranged to communicate with feed posts of said first and second monopoles and having a first length; and
   a second signal compensation path arranged to communicate with feed posts of said first and second monopoles and having a second length that differs from said first length to thereby facilitate enhancement of an antenna pattern of said antenna.

16. An antenna system to operate about a center wavelength, comprising:
   first and second antennas each formed with a ground plane and first and second monopoles that each includes:
   a feed post;
   a shorted post spaced from said feed post, coupled to said ground plane, and having a length less than one fourth of said center wavelength; and
   a top load coupled to said feed post and said shorted post and configured along orthogonal minor and major axes of said top load to have a width along said minor axis and a length along said major axis that exceeds said width;
   wherein said first and second monopoles are spaced apart along a monopole axis of their respective antenna and the major axis of each of said first and second top loads is rotated from said monopole axis by a rotation angle between 40 and 50 degrees;
   and wherein said first and second antennas are arranged with the ground plane of one facing the ground plane of the other and the monopole axis of one substantially orthogonal to the monopole axis of the other.

17. The system of claim 16, wherein said feed post and said shorted post are positioned on a post axis of their respective monopole that is substantially orthogonal to said monopole axis.

18. The system of claim 17, wherein the feed posts of said first and second monopoles are positioned on opposite sides of said monopole axis and the shorted posts of said first and second monopoles are positioned on opposite sides of said monopole axis.

19. The system of claim 16, further including in each of said antennas:
- a first signal compensation path arranged to communicate with feed posts of said first and second monopoles and having a first length; and
- a second signal compensation path arranged to communicate with feed posts of said first and second monopoles and having a second length that differs from said first length to thereby facilitate enhancement of an antenna patterns of said antenna.

20. The system of claim 16, further including, in each of said antennas,
- first and second electrical connectors;
- first and second transmission lines each connecting a feed post of a respective one of said first and second monopoles to a respective one of said first and second connectors; and
- a synthesizer arranged to provide a calibration signal to a respective one of said first and second electrical connectors.

\* \* \* \* \*